March 31, 1959     J. W. WURTZ ET AL     2,880,019
PIPE JOINT HAVING A REINFORCED EXTRUSION-RESISTANT GASKET
Filed Aug. 15, 1955

United States Patent Office 2,880,019
Patented Mar. 31, 1959

2,880,019

PIPE JOINT HAVING A REINFORCED EXTRUSION-RESISTANT GASKET

John W. Wurtz, San Gabriel, and Carl K. Wolff, La Habra, Calif., assignors, by mesne assignments, to Federal-Mogul-Bower Bearings, Inc., Detroit, Mich., a corporation of Michigan Application August 15, 1955, Serial No. 528,344

2 Claims. (Cl. 285—95)

This invention relates to gaskets, and more particularly to a novel gasket specially designed for use at high pressures and temperatures.

Unsuccessful attempts have been made to provide a satisfactory gasket for use in flanged conduit joints and like applications that will operate at both low and elevated pressures and temperatures despite frequent cycling and radically fluctuating operating conditions. Unusually extreme operating conditions are encountered, for example, in military and other aircraft where both very low and very high temperatures and pressures are conventional. Moreover, it is not uncommon to traverse the entire range in a matter of seconds after prolonged soak periods at extreme conditions, thereby subjecting the functional parts to the most severe demands.

The present invention provides a design found capable under actual operating conditions of withstanding the most rugged and exacting demands, in sharp contrast to the failure of the best product of the prior art design when subjected to parallel tests. These results are achieved according to this invention by combining the properties of a suitable pliant material with those of a rigid reinforcing material. For example, a gasket having a metal core ring and a pliant covering of silicone elastomer compounded to withstand temperatures ranging between —150° F. and 800° F. and fluid pressures at least at high as 500 pounds per square inch. Such a gasket is preferably employed in combination with a coupling having an axially rather than a radially extending gap between the mating parts in contact with the gasket for reasons to be explained below, although our unique seal can be employed with various coupling designs.

Accordingly, it is a primary object of the invention to provide a new and improved packing or gasket for withstanding unusually wide pressure and temperature fluctuations.

Another object is the provision of a gasket having a rigid main body and a pliant covering of elastomer which remains functional from very low temperatures through temperatures as high as 800° F.

A further object is the provision of a novel duct coupling which will not leak after repeated cycling at high pressures and at either high or low temperatures.

Yet another object is the provision of an O-ring sealing member of unique construction and possessing unusual operating characteristics.

Numerous other objects and advantages of the invention will become apparent from the following detailed specification taken in connection with the accompanying drawings showing one illustrative embodiment, and wherein.

Figure 1:
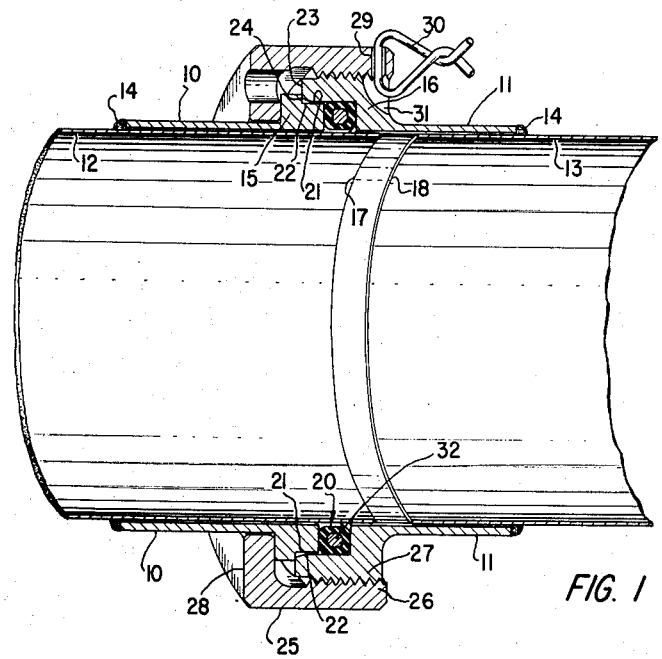
Figure 1 is a sectional perspective view through the novel duct coupling and sealing gasket in its fully assembled position.

Referring now to the drawings and particularly to Figure 1, it will be seen that the novel coupling of this invention comprises a pair of sleeves 10 and 11, the remote ends of each of which may be joined to the ends of a pair of ducts 12 and 13 in any suitable manner, as by welds 14, 14. While not essential, it is preferable that the flanged end 15 of sleeve 10 be located somewhat rearwardly of the free end of duct 12, and that the flanged end 16 of sleeve 11 overhang the free end of duct 13. When so arranged, end 17 of duct 12 telescopes beneath the flanged end 16 of sleeve 11 without contacting or abutting end 18 of duct 13.

The flanged end 16 is recessed to provide a cavity for receiving a resilient packing gasket generally designated 20. The cylindrical side wall 21 of this recess is only a few mils larger in diameter than the complemental cylindrical surface 22 of flange 15. A radially extending stop 24 cooperates with the end 23 of flange 16 to limit the extent to which flange 15 can telescope into the packing recess. Flanges 15 and 16 are held assembled by a cupped clamping ring 25 having threads 26 engageable with similar threads 27 on flange 16. Clamping ring 25 is carried about sleeve 10 and its radial end wall 28 engages with the rear face of flange 15 to hold the duct ends tightly clamped together when the ring is rotated to its closed position.

Ring 25 is locked in assembled position in any suitable manner. One positive mode comprises providing the threaded rim of the clamping ring with an opening 29 for a keeper wire 30. When ring 25 is fully assembled, opening 29 will be in alignment with one of a series of cutouts 31 on the rear corner of flange 16. When so positioned, keeper wire 30 can be threaded through openings 29 and 31 and its free ends twisted together to positively lock the clamping ring 25 against reverse rotation.

The unique gasket 20 forming an important feature of the invention has a rigid core here shown as comprising a continuous metal ring 32 of any suitable cross-section. The ring illustrated is essentially square in section except that its corners have been chamfered or rounded to eliminate the sharp corner. This core has a covering of pliant elastomer capable of withstanding a very wide range of temperatures without any material alteration in its functional characteristics. These requirements are met admirably by a suitably compounded silicone elastomer to remain pliant and resilient over temperatures ranging from —150° F. to 800° F. Prior to the application of the uncured elastomer, core ring 32 is coated with a suitable bonding agent or a primer type bonding agent. Excellent results are obtainable with a silicate primer, as for example Dow-Corning #796 or General Electric #6127.

As designed for use with the coupling shown in Figure 1, O-ring 20 should have an axial width slightly greater than the axial width of its receiving recess between flanges 15 and 16. When so made, its radial sides will be pressed snugly against the radial faces of the recess so as to form a seal therewith at low pressures. The radial width of the sealing ring should be somewhat less than the radial width of the receiving recess to make provision for the differential expansion of the silicone when hot fluids are flowing through the duct system. Thus, it is a well-known fact that silicone has a considerably higher coefficient of expansion than metals commonly used in making the coupling parts. In the arrangement shown, it is preferable to make provision for the expansion along the inner periphery by making the internal diameter of the sealing ring appreciably greater than the external diameter of tube 12 directly opposite the ring. This area of the tube is, of course, subject to the pressure of the fluid within the duct system by reason of the narrow passage between the inner face of sleeve 11 and the outer surface of the tube.

Figure 2:
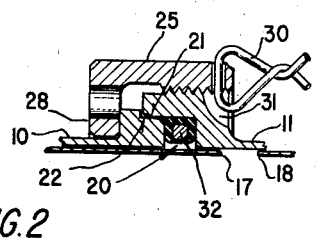
Figure 2 is a fragmentary sectional view in elevation similar to Figure 1 but showing the gasket when subjected to high fluid pressure.

Referring to Figure 2 which shows the position of the ring when the duct system is under high pressure such, for example, as 500 pounds per square inch, it will be noted that the pressure has forced the silicone covering on core ring 32 to "flow" outwardly and completely fill all crevices and portions of the sealing ring recess. A small portion of the silicone covering is even forced into the very thin cylindrical gap between surfaces 21 and 22 of flanges 15 and 16. However, the strong bond between the silicone covering and the surface of ring 32, together with the relatively thin nature of the silicone covering, prevents any substantial displacement or flow of this covering into the gap between flanges 15 and 16. Accordingly, when the fluid flow ceases and the temperature and pressure returns to a normal or a low value, the covering on the sealing ring returns to its initial natural condition as illustrated in Figure 1. A slight film of silicone may remain in the gap between surfaces 21 and 22, but there is no tendency for this film to be forced further to the exterior of the gap upon subsequent fluid flows through the duct irrespective of the frequency or rapidity of the cyclings. And this has been found true even though the seal and the coupling structure associated therewith are used in jet and turbo-prop engine applications where extremely high temperature and pressure conditions are commonplace.

The function of the seal at low temperatures is also of interest. Heretofore, high temperature seals were ineffective at low temperatures due to contraction of the elastomer out of sealing contact with the walls of the coupling due to the coefficient of expansion differentials between the coupling and the elastomer. In our design, however, the volumetric contraction is held to a minimum by reason of the space occupied by the metal core. Moreover, the silicone is firmly bonded to the core as previously noted and cannot shift due to pressure and temperature differences. It will therefore be apparent that the same seal is equally effective at both extremes of the temperature and pressure scales.

Perhaps the mode of operation of the present invention and its many advantages can best be gained by comparison with an identical coupling using a sealing gasket made solely of the same silicone composition employed in the cored gasket ring 20. Such a structure is illustrated in Figures 3 to 7 wherein the same reference characters distinguished by prime will be used to designate the corresponding parts shown in Figures 1 and 2.

Figure 3:
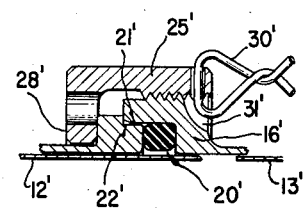
Figure 3 is a view similar to Figure 2 but showing the condition of a conventional prior art gasket in place in the coupling of the present invention as first installed and before subjection to fluid pressure.

Referring first to Figure 3, it will be seen that gasket ring 20′ is made entirely of silicone elastomer and has the same cross-sectional dimensions as the composite metal and silicone sealing ring 20 previously described in connection with Figures 1 and 2. When initially installed, the radial faces of ring 25 are sealed against the adjacent radial faces of flanges 15′ and 16′ and its internal cylindrical face is spaced outwardly of the underlying portion of duct 12′ to provide for the expansion of the silicone on a temperature rise.

Figure 4:
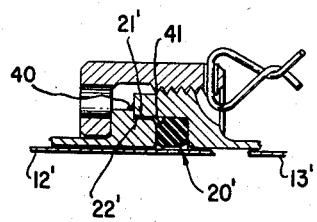
Figures 4 to 7 are views similar to Figure 3 showing various stages in the deterioration of the prior art gasket after successive cyclings at high pressures and temperatures.

Figure 4 shows the condition of the ring after a single cycle of operation at relatively high temperature and pressure. Note that the upper left-hand corner of the ring is broken away along an irregular surface and that the greater portion 40 of this elastomer is found collected at the exit of the gap between surfaces 21′ and 22′. The high temperatures of 500°, 600°, 700° F. and higher to which ring 25 is subjected in use, together with the internal pressure of the duct system, causes the silicone to seep or bleed through every possible crevice and to slowly build up in the area indicated at 40 in Figure 4. In this connection, it should be borne in mind that the interior of the silicone is not anchored to a metal core or reinforcing ring as is true of the novel construction provided by this invention. The result is that the internal pressure of the duct is effective across the full width of the gasket and gradually forces it through the thin gap between the mating surfaces of the coupling. When the pressure is cut off and the temperature falls, the parts of the coupling, as well as of the gasket, contract as they cool. The portion of elastomer trapped in the gap between surfaces 21′ and 22′ breaks away from the upper left-hand corner of the seal as indicated at 41.

Figure 5:
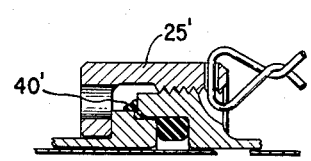
Figure 6:
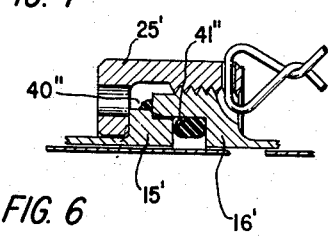

The condition of the ring upon the next cycle of operation is illustrated in Figure 5. Note that the internal pressure of the duct has again forced the seal 20′ to occupy the outer portion of its receiving recess and to force further increments of the gasket through the gap between surfaces 21′ and 22′ to augment the size of ring 40 at the exit end of the gap. Accordingly, when the cycle terminates, the gasket proper contracts and exhibits the condition illustrated in Figure 6. At this time, an even larger portion 41″ has been detached from the ring and forced to the exterior of the coupling as indicated at 40″.

Figure 7:
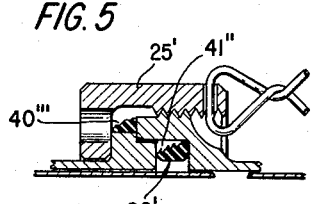

Eventually, the conditions will reach or surpass those indicated in Figure 7 in which a major portion of the sealing ring 20′ has been forced out of the seal mounting recess. As a matter of fact, it is not uncommon for this inoperative condition to be reached after only 4 or 5 cycles under the conditions encountered in aircraft engine use. However, when the reinforced ring illustrated in Figures 1 and 2 is used, completely reliable service of months duration and countless cycles is obtained.

While only a single embodiment of the invention has been specifically illustrated and described, it will be quite apparent to those skilled in this art that the design of both the gasket and the coupling with which it is used may be varied in many respects without departure from the essential principles of the invention. For example, the cross-sectional contour of the sealing ring may be varied at will. In certain applications it will be desirable to employ a relatively thin wide washer type of gasket using a thin metal reinforcing ring. In other situations, a cylindrical sleeve-like gasket might be desirable, or one having an oval or elliptical cross-section. In other words, the cross-sectional contour may be selected at will, the important consideration being the use of a high strength reinforcing ring having a relatively thin covering of pliant elastomer whose characteristics are relatively unaffected over a wide range of temperatures. And of course it is quite desirable, though not essential in all instances, that this covering be firmly bonded to the reinforcing member. The design of the coupling with which the sealing gasket is used is also subject to many changes in design so long as adequate provision is made for accommodating the expansion of the silicone upon temperature rises.

We claim:

1. In a fluid-tight joint comprising a pair of fluid conducting members, means securing said members against substantial relative movement, said members cooperating and forming an annular groove therebetween and being in substantially abutting relation externally of said groove, a gasket compressed between surfaces of said members forming said groove and adapted to seal said joint against high pressure differentials at temperatures ranging between −150° F. and 800° F., said gasket comprising a continuous rigid solid metal core ring having a continuous covering of resilient silicone rubber bonded thereto and said covering being relatively thin in comparison with the cross-sectional diameter of said gasket and capable of withstanding said pressures and temperatures without adverse effect, whereby said metal core provides a rigid non-rotary support for said resilient covering and retaining same against plastic flow between the abutting faces of said members externally of said groove.

2. In a fluid-tight joint comprising a pair of fluid conducting members, means securing said members against substantial relative movement, said members cooperating and forming an annular groove therebetween and being in substantially abutting relation externally of said groove, a gasket compressed between surfaces of said members forming said groove and adapted to seal said joint against high pressure differentials at temperatures ranging between −150° F. and 800° F., said gasket comprising an annular solid metal ring rectangular in cross-section to provide axial and radial faces with the corners thereof rounded, and a thin resilient silicone elastomer covering said rigid ring and bonded to it by a high-strength bonding agent stable substantially throughout the same temperature range as said silicone elastomer, said elastomer being relatively thin in comparison with the cross-sectional diameter of said sealing gasket, whereby forces normally tending to shear portions of the gasket from each other are resisted by the rigid ring in the core thereof and by the bonding of the outer resilient silicone to said ring.

References Cited in the file of this patent

UNITED STATES PATENTS

| | | |
|---|---|---|
| 207,871 | Horton | Sept. 10, 1878 |
| 2,377,674 | Chisholm | June 5, 1945 |
| 2,433,732 | Brown | Dec. 30, 1947 |
| 2,493,996 | Parmesan | Jan. 10, 1950 |
| 2,497,987 | Goode | Feb. 21, 1950 |
| 2,560,263 | Wiegand | July 10, 1951 |
| 2,589,136 | Ralston | Mar. 11, 1952 |
| 2,647,773 | Berner | Aug. 4, 1953 |
| 2,717,024 | Jelinek | Sept. 6, 1955 |
| 2,728,546 | De Giers | Dec. 27, 1955 |

OTHER REFERENCES

A Handbook on Synthetic Rubber Packings, pages 78–79, E. F. Houghton and Company, 1947.